United States Patent [19]
Herrick et al.

[11] Patent Number: 5,265,991
[45] Date of Patent: Nov. 30, 1993

[54] RETRACTABLE CARGO RESTRAINT AND CARGO RESTRAINING SYSTEM

[75] Inventors: William H. Herrick, Livonia; Shivshankar S. Burde, Farmington Hills; Ronald J. Vermeulen, Birmingham, all of Mich.

[73] Assignee: AAR Corp., Elk Grove Village, Ill.

[21] Appl. No.: 969,590

[22] Filed: Oct. 30, 1992

[51] Int. Cl.$^5$ ............................................. B60P 7/08
[52] U.S. Cl. ............................. 410/69; 410/77; 410/79; 244/118.1
[58] Field of Search .................. 410/69, 70, 72–75, 410/77–79, 83, 84, 80; 244/118.1

[56] References Cited

U.S. PATENT DOCUMENTS

| | | | |
|---|---|---|---|
| 3,709,450 | 1/1973 | Watts et al. | 410/79 |
| 3,906,870 | 9/1975 | Alberti | 410/79 |
| 4,144,821 | 3/1979 | Lang | 410/79 |
| 4,234,278 | 11/1980 | Harshmann et al. | 410/69 |
| 4,331,412 | 5/1982 | Graf | 410/69 |
| 4,349,302 | 9/1982 | Ferguson, Jr. | 410/69 |
| 4,696,609 | 9/1987 | Cole | 410/69 |
| 5,004,387 | 4/1991 | Jensen et al. | 410/69 |
| 5,090,638 | 2/1992 | Eilenstein-Wiegmanns et al. | 410/69 X |

FOREIGN PATENT DOCUMENTS 2541211  8/1984  France .......................... 410/79

Primary Examiner—Michael S. Huppert
Assistant Examiner—Stephen T. Gordon
Attorney, Agent, or Firm—Lee, Mann, Smith, McWilliams, Sweeney & Ohlson

[57] ABSTRACT

A cargo restraint for use with a cargo carrying deck in an aircraft, the deck having an upper support surface. The restraint includes a base adapted for attachment to the deck and a guide member pivotally attached to the base. The guide member is adapted to overlie the side edge of a cargo carrying unit to vertically and laterally restrain a cargo carrying unit. The guide member also forms a vertical and lateral guide during movement of a cargo carrying unit within the aircraft. The guide member is pivotal between an upright operating position and a retracted position wherein the guide member is located below the support surface of the cargo deck and is additionally pivotal to a latched position. A spring biases the guide member from the retracted and latched positions to the upright position. A latch releasably retains the guide member in the latched position.

22 Claims, 2 Drawing Sheets

RETRACTABLE CARGO RESTRAINT AND CARGO RESTRAINING SYSTEM

BACKGROUND OF THE INVENTION

This invention relates to restraints and restraining systems used to vertically and laterally restrain cargo carrying units such as pallets or containers in aircraft and to vertically and laterally guide cargo units as the units are moved within the aircraft into the position they are to occupy during flight, and in particular to restraints which automatically retract out of the path of a moving cargo unit and which can be selectively latched in a retracted position.

Cargo which is to be transported by aircraft is generally loaded into a cargo carrying unit. The cargo units are generally either full-size units or half-size units which have a width somewhat less than the width of a full-size cargo unit. As cargo units are loaded or unloaded from an aircraft, it is desirable to provide lateral guides at each side of the path traveled by the cargo units to provide guidance as the cargo units are being moved. When the cargo units are in their final loaded position in the aircraft, it is required to provide the cargo units with longitudinal, lateral and vertical restraint.

U.S. Pat. No. 4,331,412, assigned to the assignee of the present invention, discloses a prior form of cargo restraint, which allows cargo units to pass over the restraint.

However, in one embodiment, the restraint cannot be secured in a retracted position, since it automatically returns to an upright position. In another embodiment, the restraint can be secured in a retracted position, however unique retracted and secured positions distinct from each other are not disclosed. The present invention provides for both lateral and vertical restraint of cargo units, while providing means for positioning the restraint in both a retracted position and a distinct secured position below the roller plane of the cargo units.

SUMMARY OF THE INVENTION

The present invention is a restraint for attachment to a cargo carrying deck of an aircraft, truck, ship, train or other cargo transporting vehicle wherein the deck has an upper support surface over which cargo carrying units are movable. The restraint comprises a base adapted for attachment to the cargo carrying deck and a guide member pivotally attached to the base. The guide member comprises a post pivotally connected to the base by a shaft and a pair of arms extending laterally from the top end of the post. The guide member is adapted to overlie a side edge of a cargo unit and to form a vertical and lateral guide for the cargo unit during movement of the cargo unit and to provide vertical and lateral restraint. The guide member is pivotally connected to the base such that the guide member may pivot between an upright operating position and a retracted position wherein the guide member is located below the upper support surface of the cargo carrying deck. The guide member may also be pivoted from the upright operating position, beyond the retracted position, to a latched position. A resilient member such as a spring biases the guide member from the retracted or latched positions to the upright position. A latch is slidably mounted on the base member for releasably engaging and retaining the guide member in the latched position. The latch is movable between extended and retracted positions and is biased towards the extended position by a resilient member such as a spring. The latch is movable to the retracted position by a lever, which may be foot operated, to release the guide member.

The restraint is usable in a cargo restraining system in an aircraft or other cargo transporting vehicle having a cargo carrying deck. The restraining system comprises a first guide surface which extends in a longitudinal direction along the floor of the cargo deck and a second guide surface extending in a longitudinal direction along the floor spaced apart and parallel to the first guide surface. The guide surfaces are adapted to overlie a side edge of a cargo unit and to provide vertical and lateral guidance during longitudinal movement of the cargo units and restraint from vertical and lateral movement. The first and second guide surfaces are spaced apart a distance to retain and guide a full-size cargo unit therebetween. A plurality of restraints are spaced apart from one another along a line parallel to and located between the first and second guide surfaces. Full-size units can be rolled along the cargo carrying deck effectively guided and restrained by the first and second guide surfaces. When a full-size cargo unit engages a restraint, the cargo unit pivots the guide member of the restraint to the retracted position wherein the cargo unit may roll unimpeded over and past the guide member. When the cargo unit has passed the restraint, the guide member will automatically return to the upright operating position. Half-size cargo units are effectively restrained and guided on one side by the first or second guide surface and on the other side by one or more of the restraints.

DESCRIPTION OF AN EXAMPLE EMBODYING THE BEST MODE OF THE INVENTION

Figure 1:
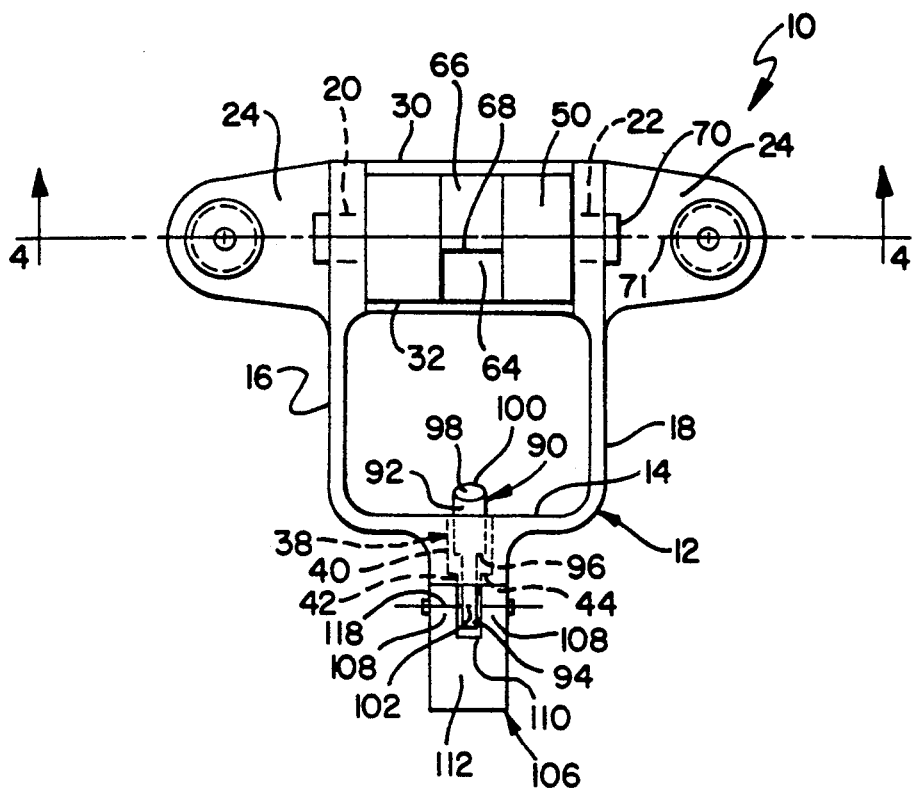
FIG. 1 is a top plan view of one form of restraint according to the invention.
Figure 2:
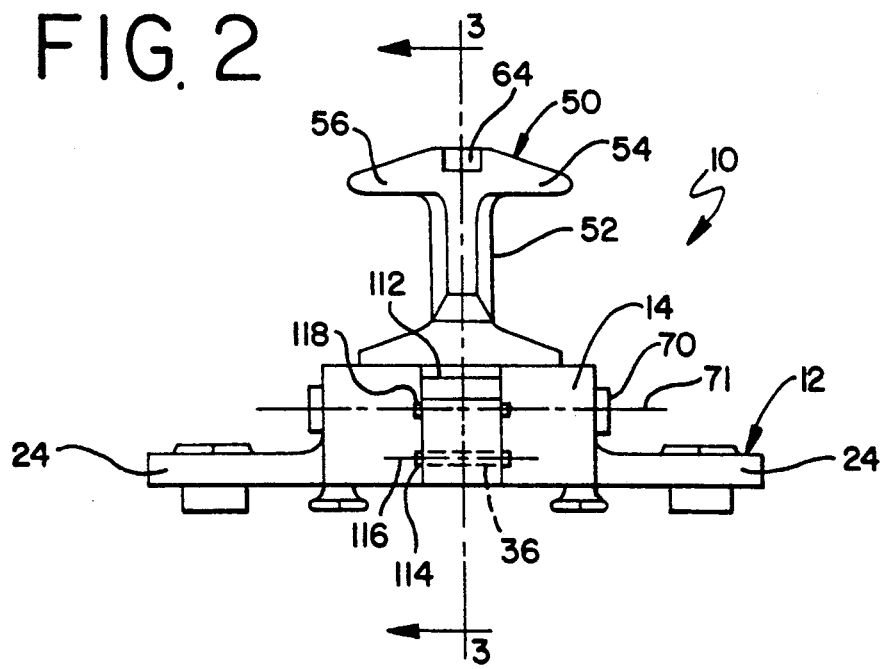
FIG. 2 is a front elevational view of the restraint.

The restraint 10 of the present invention includes a base member 12 having a vertical front wall 14, a vertical first side wall 16 and a vertical second side wall 18. The first side wall 16 and the second side wall 18 are attached at their proximal ends to opposite ends of the front wall 14 and extend perpendicularly from the front wall 14 spaced apart and parallel to one another. The distal end of the first side wall 16 includes a horizontal bore 20 extending perpendicularly therethrough and the distal end of the second side wall 18 includes a horizontal bore 22 extending perpendicularly therethrough. The bores 20 and 22 are of equal diameter and are aligned coaxially with one another. An ear 24 extends horizontally outward from the distal end of each side wall 16 and 18. A first rectangular bar 30 and a second rectangular bar 32, best shown in FIG. 3, extend between the distal ends of the side walls 16 and 18. The bars 30 and 32 are spaced apart and parallel to one another and are located on opposite sides of the bores 20 and 22. The bars 30 and 32 are located at the bottom edges of the side walls 16 and 18 and extend vertically only a portion of the height of the side walls 16 and 18, remaining below the bores 20 and 22.

A tab 34 projects outwardly from the center of the front wall 14 of the base 12. A horizontal bore 36 extends through the tab 34 parallel to the bores 20 and 22. A bore 38 extends horizontally through the center of the front wall 14, above the tab 34, in a direction perpendicular to the front wall 14 and the bores 20 and 22. The bore 38 forms a first circular wall 40 having a first diameter and a second circular wall 42 having a second and smaller diameter. The first circular wall 40 extends from the inside surface of the front wall 14 and the second circular wall 42 extends from the outside surface of the front wall 14 coaxially with the first circular wall 40. An annular shoulder 44 is formed within the bore 38 between the circular walls 40 and 42.

Figure 4:
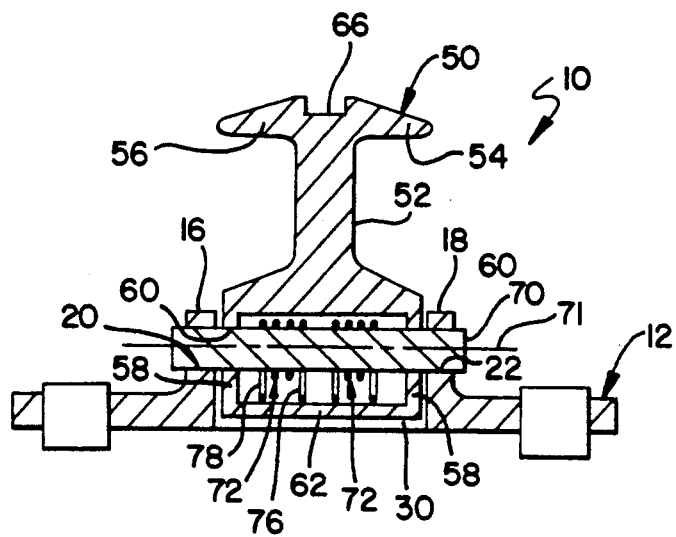
FIG. 4 is a cross-sectional view taken along lines 4—4 of FIG. 1.

The restraint 10 also includes a guide member 50 which is pivotally attached to the base 12. The guide member 50 is comprised of a post 52 and a pair of arms 54 and 56 which extend laterally from the top of the post 52 in opposite directions. The arms 54 and 56 are adapted to overlie a side edge of a cargo carrying unit to provide cargo units with vertical guidance during longitudinal movement of the cargo units and restraint from vertical movement when the cargo units are being moved or are stationary. The post 52 provides cargo units with lateral guidance during longitudinal movement of the cargo units and restraint from lateral movement when the cargo units are being moved or are stationary. The bottom end of the post 52 includes a pair of spaced apart and parallel downwardly extending legs 58 as best shown in FIG. 4. A horizontal bore 60 extends through each leg 58. The bores 60 are coaxially aligned with the bores 20 and 22 in the side walls 16 and 18. A brace 62 extends between the bottom ends of the legs 58. The top surface of the brace 62 is located approximately coplanar with the top surfaces of the bars 30 and 32. The top of the post 52 includes a sloped surface which forms a ramp 64 and includes a groove 66 which forms a projection in the nature of a lip 68 at one end of the ramp 64.

A cylindrical shaft 70 extends through the bores 60 in the legs 58 and through the bores 20 and 22 in the base 12. The shaft 70 connects the guide member 50 to the base 12 and provides for pivotal movement of the guide member 50 about an axis 71 coextensive with the shaft 70. Various other means for providing a pivotal connection between the guide member 50 and the base 12 may be utilized as desired including the use of springs, resilient or elastomeric connectors or hinges.

One or more spring members 72 engage the guide member 50 and the base 12. The spring members 72 bias the guide member 50 to an upright operating position as shown at A in FIG. 3. Each spring member 72 comprises a wire 74 extending between a first end 76, which engages the brace 62 and the first bar 30 of the base 12, and a second end 78 which engages the brace 62 and the second bar 32. The wire 74 is wrapped one or more times around the shaft 70. Various other means for biasing the guide member 50 to the upright operating position A may be used as desired and may include the use of any type of resilient or elastomeric materials.

Figure 3:
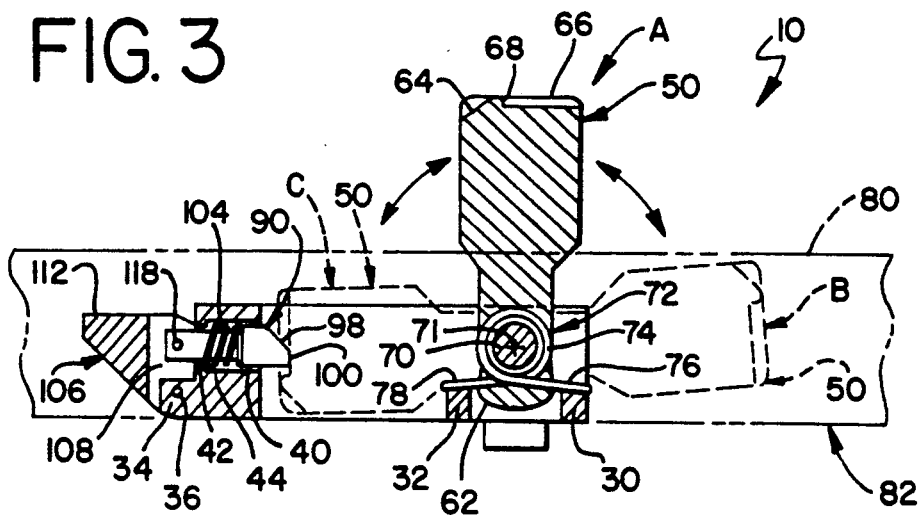
FIG. 3 is a cross-sectional view taken along lines 3—3 of FIG. 2.

The guide member 50 may be pivoted about the axis 71 in a clockwise direction from the upright position A, away from the front wall 14, to a retracted position as shown in phantom at B in FIG. 3 wherein the guide member 50 is located completely below the upper support surface 80 of a cargo carrying deck 82 of an aircraft. The guide member 50 may also be pivoted about the axis 71 in a counterclockwise direction from the upright position A, towards the front wall 14, to a corresponding retracted position B, not shown, below the upper support surface 80 of the cargo deck 82. In addition, the guide member 50 may be rotated in a counterclockwise direction, toward the front wall 14, past the corresponding retracted position B, not shown, to a latched position as shown in phatom at C in FIG. 3.

When the guide member 50 is pivoted in a clockwise direction, the first end 76 of the spring member 72 will press against the first bar 30 and the second end 78 of the spring member 72 will press against the brace 62, thereby urging the guide member 50 to pivot to the upright position A. When the guide member 50 is pivoted in a counterclockwise direction, the second end 78 of the spring member 72 will press against the second bar 32 and the first end 76 of the spring member 72 will press against the brace 62, thereby also urging the guide member 50 to pivot to the upright position A. When the guide member 50 is in the upright position A, the first end 76 of the spring member 72 will press against the first bar 30 with a force equal to the force with which the second end 78 of the spring member 72 is pressing against the second bar 32, thereby maintaining the guide member 50 in the upright position A.

The restraint 10 also includes a latch 90 for releasably retaining the guide member 50 in the latched position C. The latch 90 is located within the bore 38 of the base 12 and is slidable therein between retracted and extended positions. The latch 90 includes a first circular shaft 92 adapted to fit within the first circular wall 40 of the bore 38 and a second circular shaft 94 adapted to fit within the second circular wall 42 of the bore 38. The latch 90 includes a circular shoulder 96 located between the first and second shafts 92 and 94. The first shaft 92 of the latch 90 includes a sloped surface 98 at one end which terminates in a tip 100. The sloped surface 98 is adapted to slidably engage the ramp 64 of the guide member 50 to facilitate the sliding movement of the latch 90 from the extended position to a retracted position. The tip 100 is adapted to engage the lip 68 at the top of the guide member 50 to thereby retain the guide member 50 in the latched position C. The end of the second shaft 94 includes a horizontal bore 102. A spring 104 placed around the second shaft 94 engages the shoulder 44 of the base 12 and the shoulder 96 of the latch 90. The spring 104 biases the latch 90 toward the extended position shown in FIGS. 1 and 3.

A lever 106 is pivotally attached at a lower end to the tab 34 of the base 12. The lever 106 is also pivotally attached at an upper end to the second shaft 94 of the latch 90. The lever 106 includes a pair of spaced apart legs 108 formed by a vertical slot 110 and a generally horizontal upper surface 112. The tab 34 is located in the slot 110 between the legs 108 of the lever 106. A cylindrical shaft 114 extends through the lower end of the legs 108 and through the bore 36 in the tab 34 to pivotally attach the lever 106 to the base 12 for pivotal movement about an axis 116. The end of the second shaft 94 of the latch 90 is also located in the slot 110 between the legs 108 of the lever 106. A cylindrical shaft 118 extends through the upper end of the legs 108 and through the bore 102 in the second shaft 94 to thereby pivotally attach the lever 106 to the latch 90. The spring 104 biases the latch 90 in a direction towards the guide member 50 until the legs 108 of the lever 106 contact the outer surface of the front wall 14 whereupon the latch 90 is in the fully extended position as shown in FIG. 3. Rotation of the lever 106 about the axis 116 in a counterclockwise direction, by application of a downward force upon the upper surface 112 of the lever 106, will translate the latch 90 in a direction away from the guide member 50, while compressing the spring 104, to a retracted position wherein the latch 90 cannot engage the guide member 50. When the downward force is removed from the lever 106, the spring 104 will return the latch 90 to the fully extended position. The downward force applied to the lever 106 may be generated by a person stepping on the lever 106 with their foot.

When the guide member 50 is pivoted to the latched position C, the sloped surface 98 of the latch 90 will slidingly engage the ramp 64 of the guide member 50. As the guide member 50 continues to be pivoted towards the latched position C, and as the ramp 64 slides along the sloped surface 98, the latch 90 will be pushed towards the retracted position. Once the lip 68 of the guide member 50 is pivoted past the tip 100 of the latch 90, the spring 104 will automatically urge the latch 90 to its fully extended position wherein the tip 100 will extend into the groove 66 and will engage the lip 68 to thereby releasably retain the guide member 50 in the latched position C. When it is desired to release the guide member 50 from the latched position C, a downward force is applied to the upper surface 112 of the lever 106 to thereby retract the latch 90 and to release the guide member 50, whereupon the spring member 72 will automatically urge the guide member 50 to the upright operating position A wherein the guide member 50 is operative to guide and restrain cargo units. The guide member 50 is capable of being pivoted to the retracted position B, in either a clockwise or counterclockwise direction, when engaged by a full size cargo unit to allow the cargo unit to pass over and beyond the restraint 10. The guide member 50 will return to the upright position A once the cargo unit has passed beyond the restraint 10. The guide member 50 may also be selectively pivoted to the latched position C wherein the guide member 50 will be releasably retained below the support surface 80 of the cargo deck 82, completely out of the path of cargo units.

Figure 5:
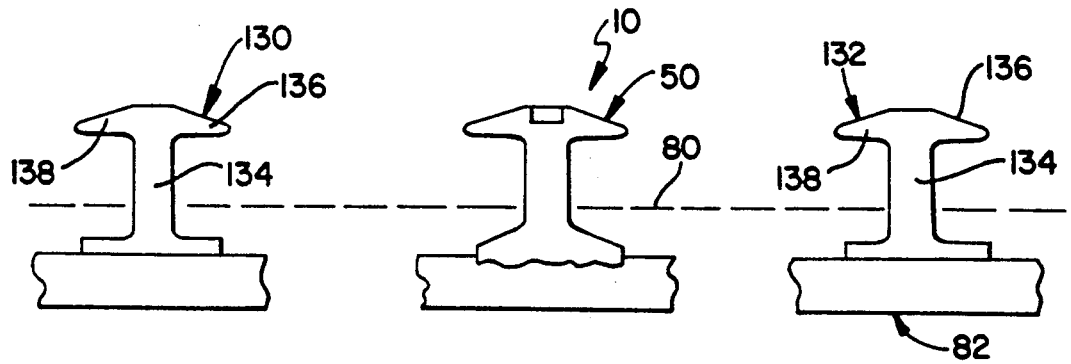
FIG. 5 is a diagram showing the cargo restraining system of the present invention.

As shown in FIG. 5, one or more restraints 10 may be used as part of a cargo restraining system. The cargo restraining system comprises a first guide surface 130, a second guide surface 132 and a plurality of restraints 10. The guide surfaces 130 and 132 and the restraints 10 are attached to the floor of the cargo deck 82. The first and second guide surfaces 130 and 132 are spaced apart and parallel to one another and extend continuously along the cargo deck 82 in a direction parallel to the direction in which the cargo units are to be moved. Each guide surface 130 and 132 includes a vertical web 134, an arm 136 laterally extending from the top of the web 134, and an arm 138 laterally extending in an opposite direction from the top of the web 134. The arms 136 and 138 are adapted to overlie a side edge of a cargo unit and thereby vertically guide and restrain the cargo unit. The web 134 of the guide surfaces 130 and 132 forms a lateral restraint and a lateral guide during movement of the cargo units to their final loaded positions. A plurality of restraints 10 are spaced apart from one another along a line parallel to and located between the first and second guide surfaces 130 and 132. The axis 71 about which the guide member 50 of the restraint 10 pivots is orientated perpendicular to the guide surfaces 130 and 132 and parallel to the support surface 80.

When a full-size cargo unit is loaded, the full-size unit will extend between the first guide surface 130 and the second guide surface 132 and will be vertically and laterally restrained and guided thereby. As a full-size cargo unit is moved to its loading position, the full-size cargo unit will engage the guide members 50 of the restraints 10 located between the guide surfaces 130 and 132 and will pivot the guide members 50 to the retracted position B or corresponding position whereupon the full-size cargo unit will pass over the restraints 10. Once the full-size cargo unit has passed by a restraint 10, the guide member 50 will return automatically to the upright operating position A. When a half-size cargo unit is loaded, it will extend between one of the guide surfaces 130 or 132 and one or more of the restraints 10. The guide surfaces 130 or 132 will vertically and laterally restrain and guide one side of the half-size cargo unit while one or more restraints 10 will vertically and laterally restrain and guide the opposite side of the half-size cargo unit.

While a primary and preferred embodiment of the invention has been illustrated in the drawings and described above, it will be evident that various changes can be made to the invention without departing from the spirit thereof or scope of the following claims.

What is claimed is:

1. A restraint for use with a cargo carrying deck having an upper support surface over which cargo carrying units are movable, said restraint comprising:
    a base adapted for attachment to the cargo carrying deck;
    a guide member pivotally attached to said base, said guide member including means for guiding and restraining movement of a cargo carrying unit;
    means for pivotally connecting said guide member to said base, said connecting means providing for pivotal movement of said guide member about a first axis between an upright operating position and a retracted position wherein said guide member is located below the support surface of the cargo carying deck, and said connecting means further providing for pivotal movement of said guide member to a latched position, said latched position being different from and beneath said retracted position;
    means for biasing said guide member from said retracted position and from said latched position to said upright position whereby said biasing means urges said guide member to said upright position while permitting said guide member to pivot to said retracted position when engaged by a cargo carrying unit; and
    means for releasably retaining said guide member in said latched position whereby said biasing means serves to automatically return said guide member from said latched position to said upright position upon release from said retaining means.

2. The restraint of claim 1 wherein said connecting means comprises a shaft extending through said base and said guide member.

3. The restraint of claim 1 wherein said biasing means comprises a spring engaging said base and said guide member.

4. The restraint of claim 1 wherein said guide member includes means for laterally guiding a cargo carrying unit during movement of the cargo carrying unit.

5. The restraint of claim 1 wherein said guide member comprises a post pivotally connected to said base by said connecting means and a first arm laterally extending from the top of said post.

6. The restraint of claim 5 wherein said guide member includes a second arm laterally extending from said post in a direction opposite from said first arm.

7. The restraint of claim 1 wherein said guide member is selectively pivotal from said upright operating position in a first pivotal direction about said first axis to a first retracted position and in a second pivotal direction about said first axis to a second retracted position.

8. The restraint of claim 1 wherein said retaining means comprises a latch slidably mounted on said base, said latch being slidable between an extended position for retaining said guide member in said latched position and a retracted position for releasing said guide member from said latched position.

9. The restraint of claim 8 wherein said retaining means includes means for biasing said latch to said extended position.

10. The restraint of claim 9 wherein said retaining means includes a lever attached to said latch, said lever being manually operable to move said latch from said extended position to said retracted position.

11. The restraint of claim 10 wherein said lever is pivotally connected to said base for pivotal movement about a second axis.

12. A cargo restraining system for a cargo carrying deck having an upper support surface over which cargo carrying units are movable, said restraining system comprising:
- a first guide surface extending along said deck, said first guide surface including first means for guiding and restraining movement of a cargo carrying unit;
- a second guide surface extending along said deck spaced apart from and parallel to said first guide surface, said second guide surface including second means for guiding and restraining movement of a cargo carrying unit; and
- a plurality of restraints spaced apart from one another along a line parallel to and located between said first and second guide surfaces, each said restraint comprising:
- a base adapted for attachment to the cargo carrying deck;
- a guide member pivotally attached to said base, said guide member including third means for guiding and restraining movement of a cargo carrying unit;
- means for pivotally connecting said guide member to said base, said connecting means providing for pivotal movement of said guide member about a first axis between an upright operating position and a retracted position wherein said guide member is located below the support surface of the cargo carrying deck, and said connecting means further providing for pivotal movement of said guide member to a latched position, said latched position being different from and beneath said retracted position;
- means for biasing said guide member from said retracted position and from said latched position to said upright position whereby said biasing means urges said guide member to said upright position while permitting said guide member to pivot to said retracted position when engaged by a cargo carrying unit; and
- means for releasably retaining said guide member in said latched position whereby said biasing means serves to automatically return said guide member from said latched position to said upright position upon release from said retaining means.

13. The cargo restraining system of claim 12 wherein said connecting means comprises a shaft extending through said base and said guide member.

14. The cargo restraining system of claim 12 wherein said biasing means comprises a spring engaging said base and said guide member.

15. The cargo restraining system of claim 12 wherein said guide member includes means for laterally guiding a cargo carrying unit during movement of the cargo carrying unit.

16. The cargo restraining system of claim 12 wherein said guide member comprises a post pivotally connected to said base by said connecting means and a first arm laterally extending from the top of said post.

17. The cargo restraining system of claim 16 wherein said guide member includes a second arm laterally extending from said post in a direction opposite from said first arm.

18. The cargo restraining system of claim 12 wherein said guide member is selectively pivotal from said upright operating position in a first pivotal direction about said first axis to a first retracted position and in a second pivotal direction about said first axis to a second retracted position.

19. The cargo restraining system of claim 12 wherein said retaining means comprises a latch slidably mounted on said base, said latch being slidable between an extended position for retaining said guide member in said latched position and a retracted position for releasing said guide member from said latched position.

20. The cargo restraining system of claim 19 wherein said retaining means includes means for biasing said latch to said extended position.

21. The cargo restraining system of claim 20 wherein said retaining means includes a lever attached to said latch, said lever being manually operable to move said latch from said extended position to said retracted position.

22. The cargo restraining system of claim 21 wherein said lever is pivotally connected to said base for pivotal movement about a second axis.

* * * * *